(12) United States Patent
Hsia

(10) Patent No.: US 6,976,686 B2
(45) Date of Patent: Dec. 20, 2005

(54) DETACHABLE FRONT GUIDER ARRANGEMENT OF STROLLER

(76) Inventor: Ben M. Hsia, 10671 Lanark St., Sun Valley, CA (US) 91352

( * ) Notice: Subject to any disclaimer, the term of this patent is extended or adjusted under 35 U.S.C. 154(b) by 169 days.

(21) Appl. No.: 10/633,399

(22) Filed: Aug. 4, 2003

(65) Prior Publication Data

US 2004/0090044 A1 May 13, 2004

Related U.S. Application Data

(63) Continuation-in-part of application No. 09/844,651, filed on Apr. 27, 2001, now abandoned.

(51) Int. Cl.⁷ .................................................. B62B 9/24
(52) U.S. Cl. ............................... 280/47.38; 280/47.35; 224/409
(58) Field of Search ................................ 280/647, 650, 280/47.35, 47.38, 47.4, 47.34, 642; 297/148, 151, 152, 153, 174; 224/409

(56) References Cited

U.S. PATENT DOCUMENTS

| | | | | |
|---|---|---|---|---|
| 4,856,809 A | * | 8/1989 | Kohus et al. | 280/644 |
| D305,522 S | * | 1/1990 | Kohus et al. | D12/133 |
| 5,004,253 A | * | 4/1991 | Nakao et al. | 280/47.38 |
| 5,123,767 A | * | 6/1992 | Ishikura et al. | 403/24 |
| 5,244,228 A | * | 9/1993 | Chiu | 280/642 |
| 5,855,384 A | * | 1/1999 | Pike et al. | 280/47.38 |
| 5,964,501 A | * | 10/1999 | Magnani | 297/174 R |
| 6,267,404 B1 | * | 7/2001 | Yang et al. | 280/642 |
| 6,478,503 B1 | * | 11/2002 | Cheng | 403/322.4 |
| 6,698,773 B2 | * | 3/2004 | Hsia | 280/47.38 |

* cited by examiner

Primary Examiner—Christopher P. Ellis
Assistant Examiner—Jeff Restifo
(74) Attorney, Agent, or Firm—Raymond Y. Chan; David and Raymond

(57) ABSTRACT

A detachable front guider arrangement for incorporating with a stroller includes a front guider and a pair of coupling devices for detachably coupling two ends of the front guider with two front leg frames of a front frame of the stroller respectively. Each of the coupling devices includes a locking latch outwardly protruded from the respective front leg frame and a joint member mounted on the end of the front guider and detachably coupled with the front leg frame. A locking groove is formed on the joint member and arranged to engage with the locking latch so as to lock up the joint member on the front leg frame. Therefore, the front guider is capable of detachably attaching to the front frame of the stroller by securely mounting the joint members on the front leg frames respectively.

22 Claims, 7 Drawing Sheets

DETACHABLE FRONT GUIDER ARRANGEMENT OF STROLLER

CROSS-REFERENCE OF RELATED APPLICATION

This is a Continuation-In-Part application of a non-provisional application having an application Ser. No. 09/844,651 and a filing date of Apr. 27, 2001 now abandoned.

BACKGROUND OF THE PRESENT INVENTION

1. Field of Invention

The present invention relates to strollers, and more particularly to a detachable front guider arrangement for a stroller wherein the front guider is constructed to be attached to and detached from the stroller, so as to change the front guider for different uses, such as a hand bar or a food tray, to fit the needs of the user

2. Description of Related Arts

Strollers, which have become becomes a necessity to every family having a young child or baby, are considered as a convenient tool to carry the baby or young child during outdoor activities such as foot traveling and shopping.

A conventional stroller comprises a front guider mounted on a front portion of a seat frame to protect the baby or young child. It also functions as a hand bar for the baby or young child to handle. Especially, during foot traveling, a vibration force may be transferred to the stroller through the wheels such that the hand bar is important to protect the young child and keep the young child in balance.

However, due to the position of the front guider with respect to the seat frame, the front guider may block the young child from getting in and out of the stroller. So, the parent must hug overhanging the young child into the stroller. Even though the front guider can be detached from the stroller, the original structure of the stroller must be altered to incorporate the front guider, thus complicating the attaching/detaching operation. Thus, the attachment between the stroller and the front guider must be rigid enough to protect the young child. Since the young child is soft and weak, any mistakes of the front guider may cause unwanted injury to the young child.

However, the hand bar has no use when the young child is eating, in which the parent must carry the food on one hand while another hand must take care of the young child. So, a food tray is a good idea to incorporate with the stroller for placing the food on the tray.

SUMMARY OF THE PRESENT INVENTION

A main object of the present invention is to provide a detachable front guider arrangement incorporated with a stroller, wherein the front guider can be quickly and easily attached to or detached from the stroller.

Another object of the present invention is to provide a detachable front guider arrangement for a stroller, wherein the detachable front guider arrangement provides a double safety engagement, i.e. the frictional engagement and the slot-in engagement, to ensure the attachment between the detachable front guider arrangement and the stroller.

Another object of the present invention is to provide a detachable front guider arrangement for a stroller, wherein the detachable front guider arrangement is interlocked with the stroller by its physical structure in comparison with the conventional mechanical structure, so as to simplify the original structure of the detachable front guider arrangement of the present invention.

Another object of the present invention is to provide a detachable front guider arrangement for a stroller, wherein the front guider is adapted to selectively mount at a front side of the stroller as a front boundary frame for the child or young child sitting on the stroller or mount at a rear side of the stroller as a tray for the parents.

Another object of the present invention is to provide a detachable front guider arrangement for a stroller, wherein the attachment of the front guider is improved in view of safety and operability. The front guider is interlocked with the stroller in one operable action by combining two different directional movements, which is advantageous in practical use.

Another object of the present invention is to provide a detachable front guider for a stroller, which does not require that the original structural design of the stroller be altered, so as to minimize the manufacturing cost thereof.

Another object of the present invention is to provide a detachable front guider arrangement for a stroller, wherein the front guider of different kinds such as a hand bar or a food tray is interchangeable so as to fulfill the needs of the user.

Accordingly, in order to accomplish the above objects, the present invention provides a stroller which comprises a front frame having two front leg frames and a back frame constructed to support a seat frame thereon and a handle frame having two handle arms upwardly extended from the front frame.

The stroller further comprises a detachable front guider arrangement which comprises a front guider and a pair of coupling means for detachably coupling two ends of the front guider with the two front leg frames of the front frame respectively, each of the coupling means comprising a locking latch outwardly protruded from the respective front leg frame and a joint member mounted on the end of the front guider and detachably coupled with the front leg frame wherein a locking groove is formed on the joint member and arranged to engage with the locking latch so as to lock up the joint member on the front leg frame.

These and other objectives, features, and advantages of the present invention will become apparent from the following detailed description, the accompanying drawings, and the appended claims.

DETAILED DESCRIPTION OF THE PREFERRED EMBODIMENT

Figure 1:
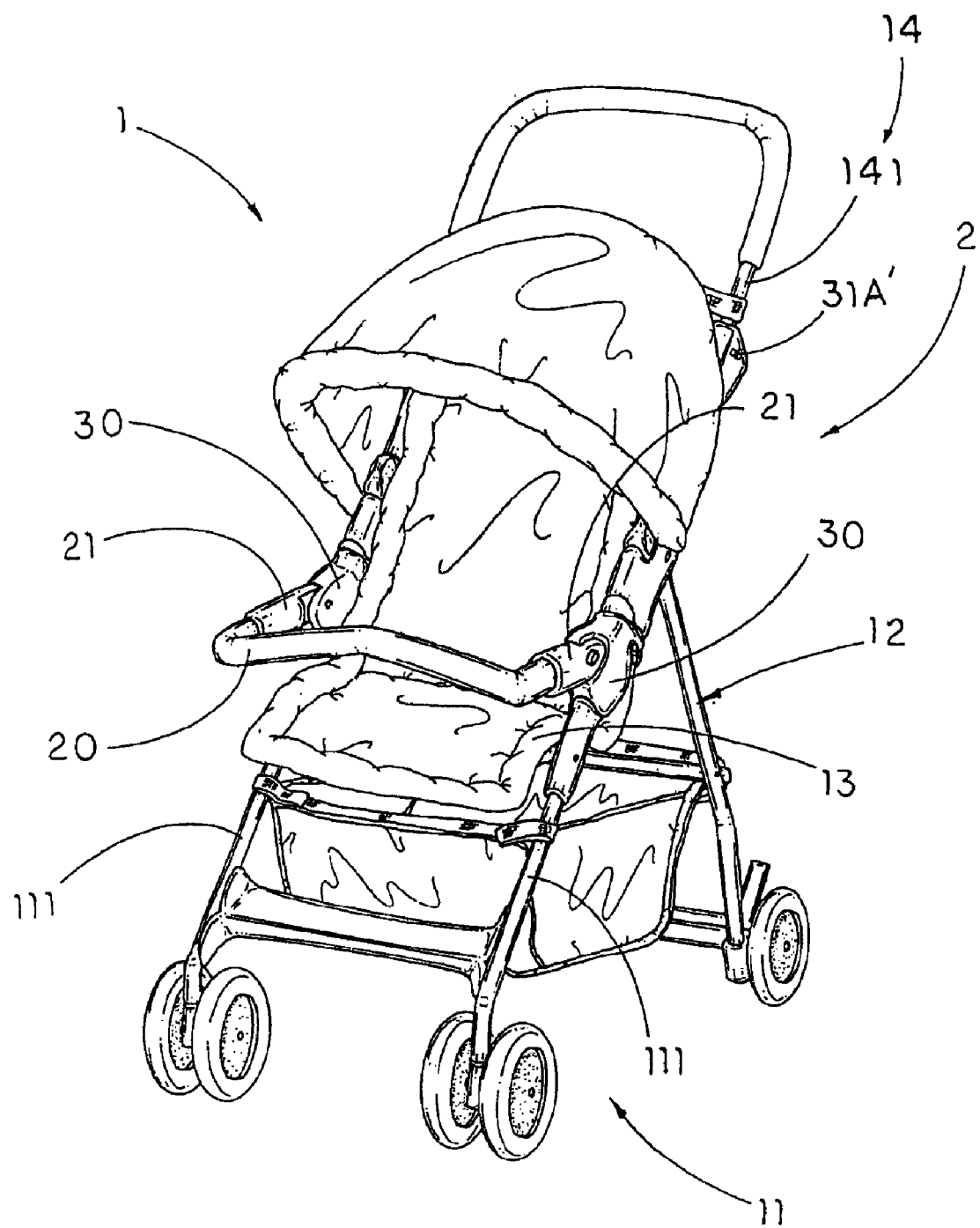
FIG. 1 is a perspective view of a stroller incorporated with a detachable front guider arrangement according to a first preferred embodiment of the present invention.

Referring to FIG. 1 of the drawings, a stroller 1 which is incorporated with a detachable front guider arrangement 2 according to a preferred embodiment of the present invention is illustrated. The stroller 1, such as a standard stroller, comprises a front frame 11 having a pair of front leg frames 111 and a back frame 12 constructed to support a seat frame 13 thereon. The stroller 1 further comprises a handle frame 14 having a pair of handle arms 141 upwardly extended from the front frame 11.

Figure 2:
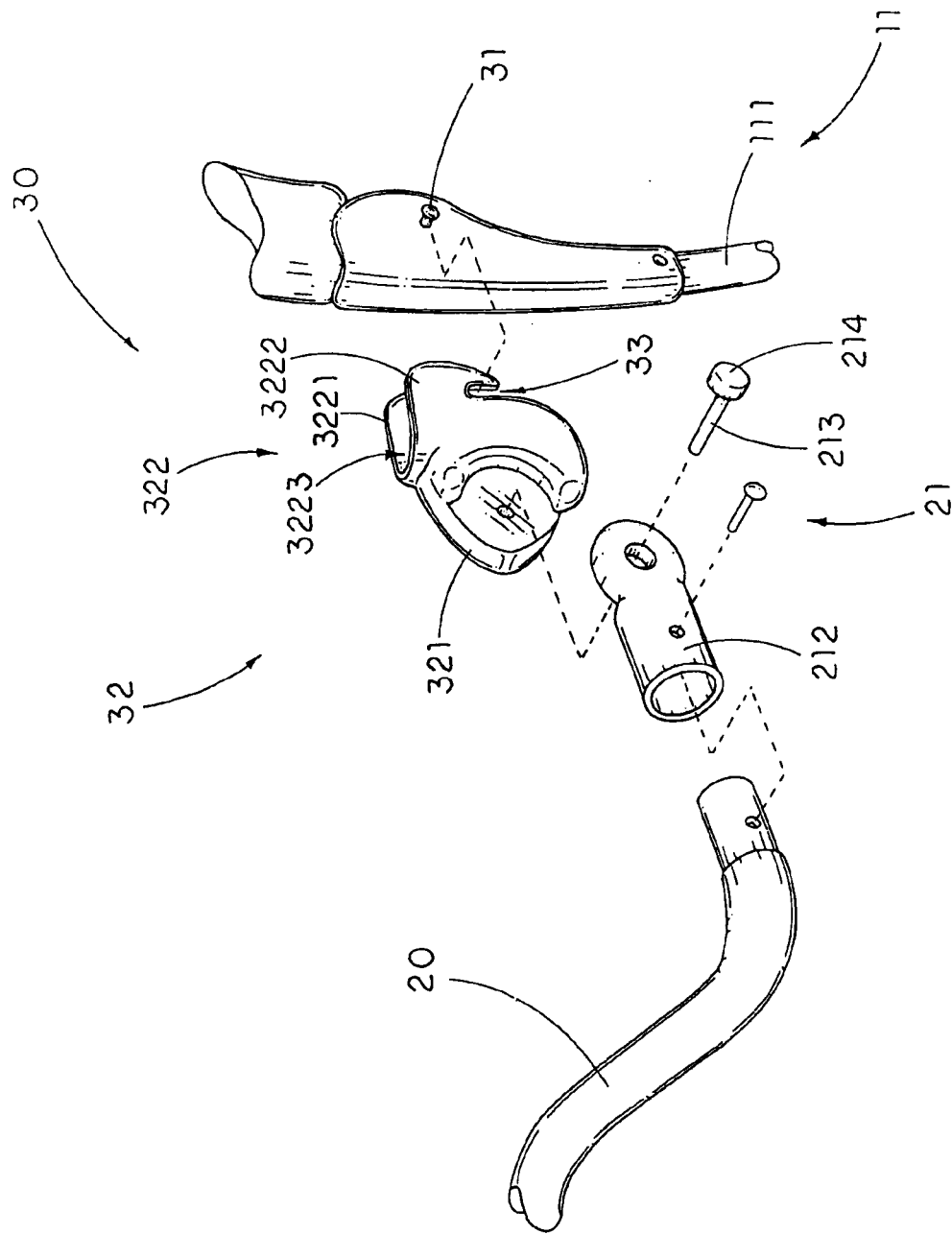
FIG. 2 is an exploded perspective view of the detachable front guider arrangement of the above first preferred embodiment of the present invention.

As shown in FIG. 2, the detachable front guider arrangement 2 comprises a front guider 20 and a pair of coupling means 30 for detachably coupling two ends of the front guider 20 with the two front leg frames 111 of the front frame 11 respectively. Each of the coupling means 30 comprises at least a locking latch 31 outwardly protruded from on outer side of the respective front leg frame 111 and a joint member 32 which is mounted on the end of the front guider 20 and detachably coupled with the front leg frame 111, wherein at least a locking groove 33 is formed on the joint member 32 and arranged to engage with the locking latch 31 so as to lock up the joint member 32 on the front leg frame 111.

According to the preferred embodiment, the locking latches 31 are opposedly and outwardly protruded from the outer sides of the two front leg frames 111 of the front frame 11 respectively. Each of the locking latches 31 is a rivet perpendicularly mounted on the outer side of the respective front leg frame 111 wherein a predetermined length of a neck portion of the rivet is protruded from the front leg frame 111.

Each of the joint members 32 comprises a head joint 321 to connect the end of the front guider and a base joint 322 having a U-shaped cross section comprising two parallel supporting walls 3221, 3222 to fittedly mount the respective front leg frame 111 therebetween, wherein the locking groove 33 is formed on the respective outer supporting wall 3221, 3222 in such a manner that when the base joint 322 is mounted on the front leg frame 111, the locking latch 31 is engaged into the locking groove 33 in a vertical movable manner, so as to lock up the joint member 32 on the front leg frame 111.

Accordingly, the locking groove 33 is an elongated groove formed on a mid-portion of the supporting wall 3222 at an edge thereof wherein an opening of the locking groove 33 is provided at a bottom end thereof to provide a quick and easy attachment that requires a slide-down action to engage the locking groove 33 with the locking latch 31 when the base joint 322 is slidably mounted on the front leg frame 111.

In addition, an inner biasing surface 3223 is formed on an inner side of the base joint 322 to bias against the respective front leg frame 111 so as to frictionally engage the joint member 32 with the respective front leg frame 111 of the front frame 11. It is worth to mention that when the inner biasing surface 3223 of the base joint 322 is biased against the respective front leg frame 111, the opening of the locking groove 33 is guided to align with the respective locking latch 31 in such a manner that the locking latches 31 are slidably engaged with the locking grooves 11 respectively when the inner biasing surfaces 3223 of the base joints 322 are downwardly slid on the front leg frames 111 respectively so as to enhance the slot-in engaging operation between the locking latch 31 and the locking groove 33.

Figure 3:
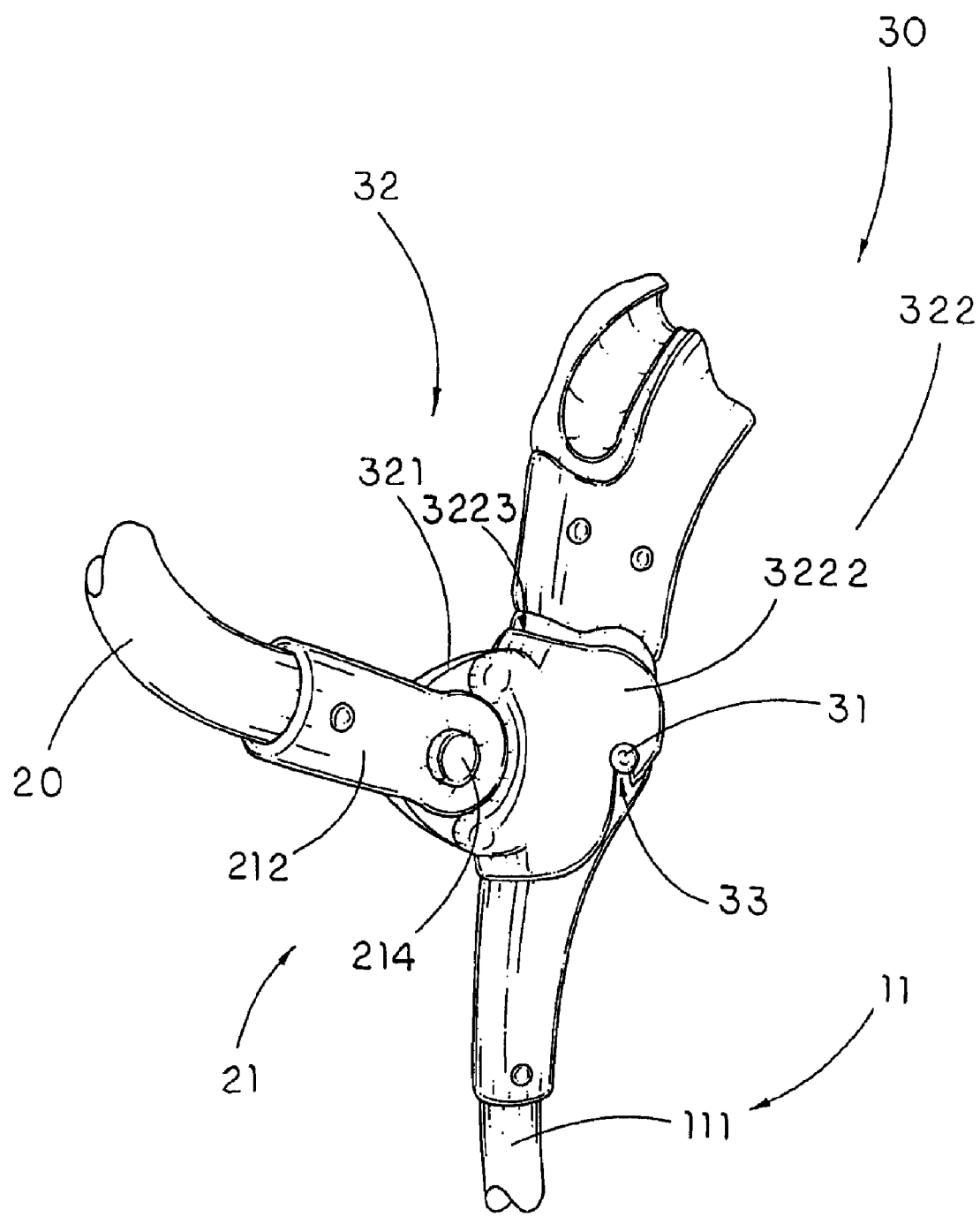
FIG. 3 is perspective view of a coupling means of the detachable front guider arrangement mounted on the stroller according to the above first preferred embodiment of the present invention.

As shown in FIG. 3, the two supporting walls 3221, 3222 of the base joint 322 has a width slightly larger than a width of the front leg frame 111 such that when the joint member 32 is mounted on the front leg frame 111, two inner surfaces of the supporting walls 3221, 3222 are biased against the front leg frame 111 in a sandwiched manner while the inner biasing surface 3223 of each of the joint members 32 is substantially biased against the respective front leg frame 111 to guide the opening of the locking groove 33 above the respective locking latch 31. So, when the locking latch 31 is engaged with the locking groove 33, the front guider 20 is securely mounted on the front frame 11 so as to prevent an unwanted movement of the front guider 20 with respect to the front frame 11.

As shown in FIG. 2, the front guider 20 is a hand bar having two ends rotatably connected to two coupling means 30 by a pair of pivot joints 21 respectively. Each of the pivot joints 21 comprises a guider holder 212 which is firmly attached to the end of the front guider 20 and pivotally attached to the head joint 321 of the joint member 32 by a shaft 213, and a locker button 214 which is provided on an outer side of the guider holder 212 and arranged for selectively locking and unlocking a rotation movement of the front guider 20 with respect to the coupling means 30. In other words, for rotating the front guider 20, inward forces must be intentionally applied on the two locker buttons 214 in order to freely rotate the front guider 20. So, the parent is able to rotatably adjust the front guider 20 at an adequate position for the young child to handle.

In order to attach the detachable front guider arrangement 2 to the stroller 1, a pushing force must be intentionally applied on the coupling means 30 to the front frame 11 so as to mount the front leg frames 111 between the two supporting walls 3221, 3222 of the base joints 322 of the joint members 32 respectively until the inner biasing surfaces 3223 of the base joints 322 are frictionally engaged with the front leg frames 111 of the front frame 11 respectively.

Then, a slide-down force is applied on the coupling means 30 to engage the locking grooves 33 with the locking latches 31 respectively while the inner biasing surfaces 3223 of the base joints 322 are sliding along the front leg frames 111 for locking the coupling means 30 on the front leg frames 111 respectively, so as to securely attach the front guider 20 to the front frame 11 of the stroller 1. In other words, the detachable front guider arrangement 2 provides a double safety engagement, i.e. the frictional engagement and the slot-in engagement, to ensure the attachment between the detachable front guider arrangement 2 and the stroller 1 by operating two different directional movements in one continued operation action.

It is worth to mention that the detachable front guider arrangement 2 of the present invention does not require any mechanical structure in order to lock up the joint members 32 with the front leg frames 111 respectively. However, the present invention designs to lock up the joint members 32 with the front leg frames 111 respectively by their physical structures to simplify the operation of the detachable front guider arrangement 2.

After attaching the detachable front guider arrangement 2 with the stroller 1 by means of the double safety engagement, the downward force applied on the front guider 20 by the user, such as a young child or even the parent, will further ensure the engagement of the detachable front guider arrangement 2 with respect to the front frame 11. Even though an upward force is applied on the front guider 20, the frictional engagement between the inner biasing surface 3223 of the base joint 322 and the front leg frame 111 will block the pivotal movement of the front guider 20 with respect to the front frame 11 so as to prevent the detachable front guider arrangement 2 from accidentally detaching from the stroller 1.

It is worth to mention that in order to detach the detachable front guider arrangement 2 from the stroller 1, the coupling means 30 must be pulled upwardly by respectively sliding the inner biasing surfaces 3223 of the base joints 322 along the front leg frames 111 at a position that the locking latches 31 are moved out of the locking grooves 33 respectively so as to prevent the front guider 20 being detached from the front frame 11 of the stroller accidentally, especially by the young child. Therefore, the detachable front guider arrangement 2 is adapted to be pulled to detach the coupling means 30 from the front frame 11 by frictionally disengaging the inner biasing surfaces 3223 of the base joints 322 with the front leg frames 111 of the front frame 11 respectively.

Figure 4:
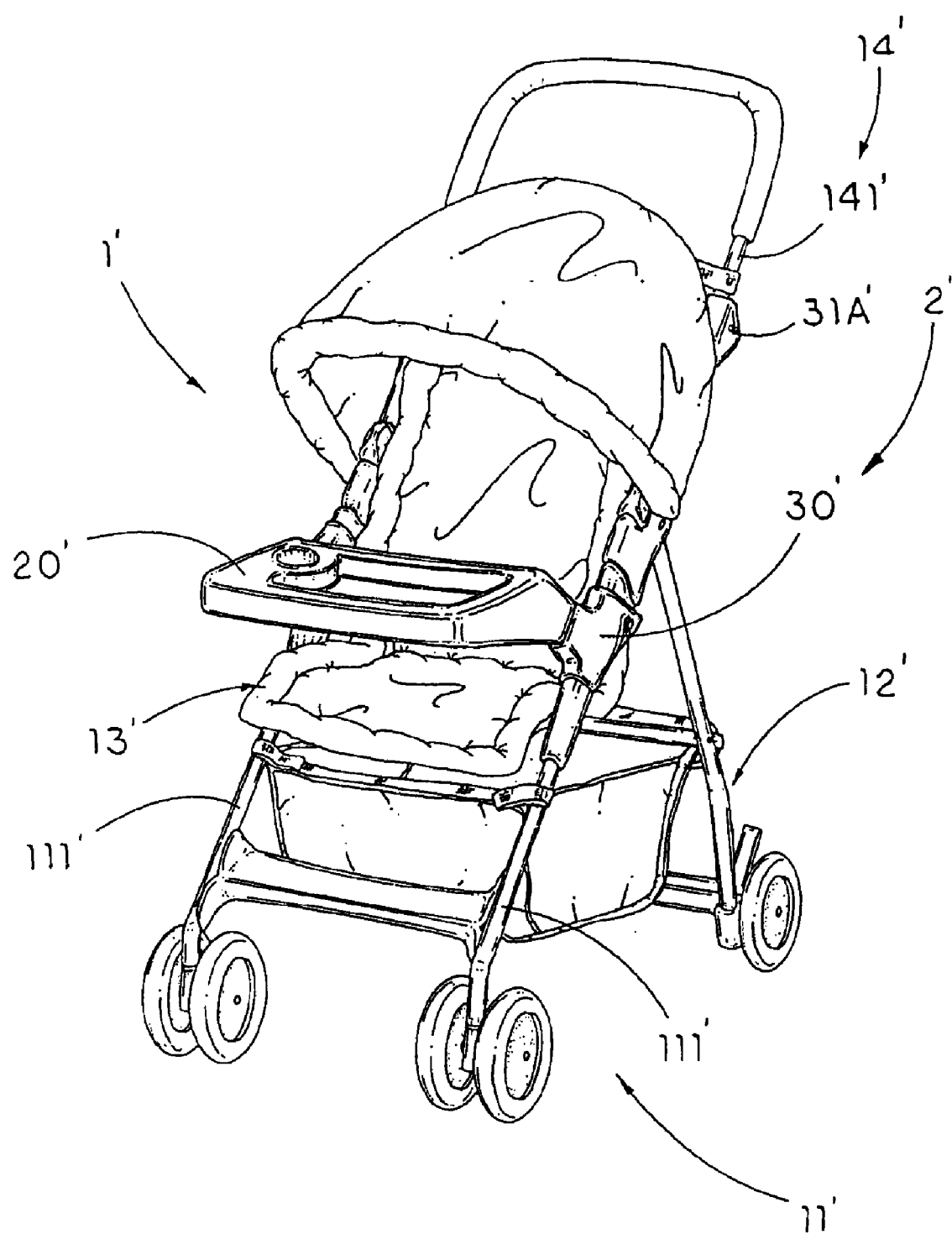
FIG. 4 is a perspective view of a detachable front guider arrangement of a second preferred embodiment of the present invention.

Referring to FIG. 4, a second embodiment illustrates an alternative mode of the detachable front guider arrangement 2' of the first embodiment, wherein the front guider 20', which is a food tray instead of the hand bar of the first embodiment, is detachably attached to the coupling means 30' in such a manner that the food tray of the front guider 20' can be detached from the stroller 1' for cleaning purposes.

Figure 5:
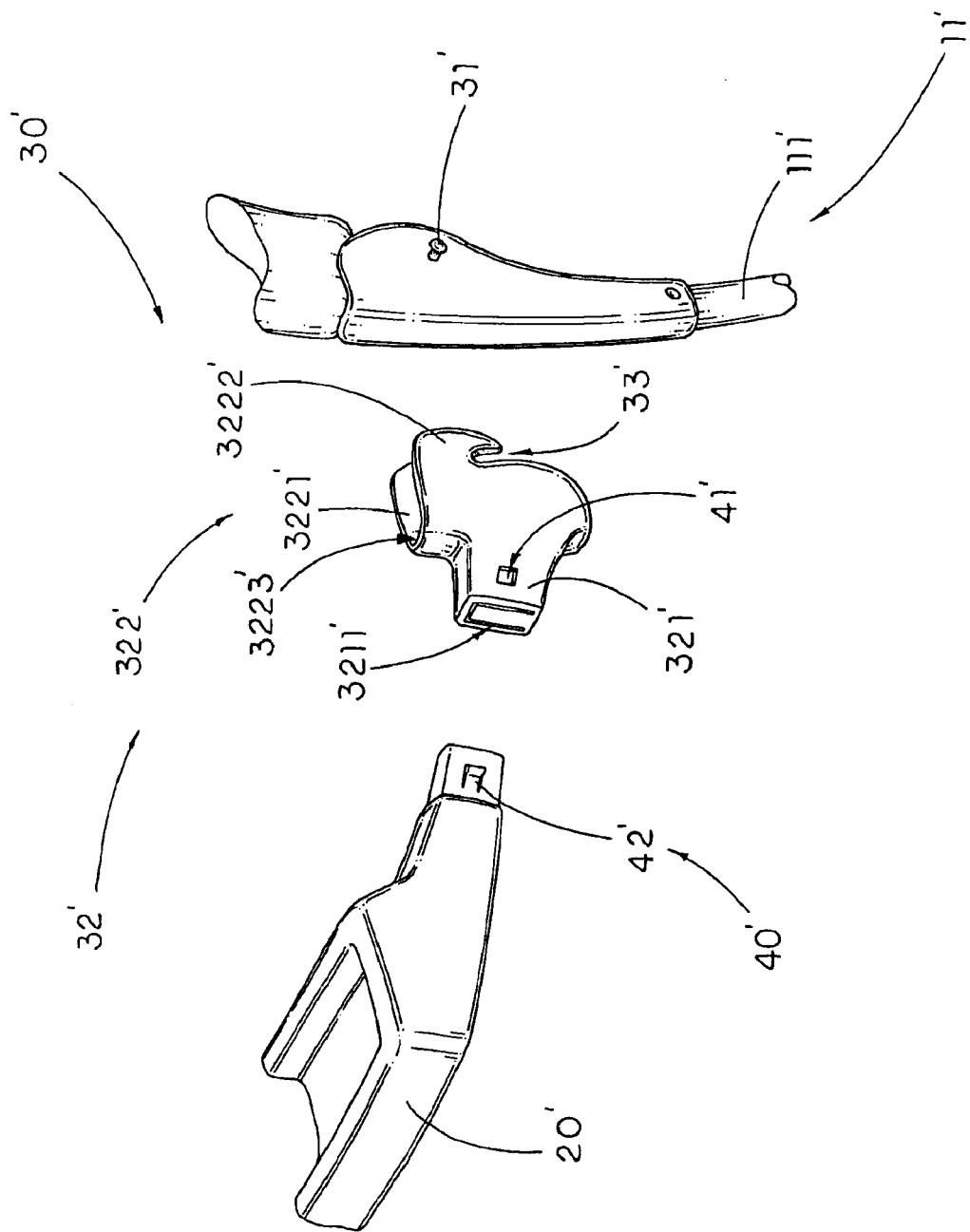
FIG. 5 is an exploded perspective view of the detachable front guider arrangement according to the above second preferred embodiment of the present invention.

As shown in FIG. 5, the head joint 321' of the joint member 32' comprises a U-shaped extending slot 3211' wherein the end of the front guider 20' having a U-shaped cross section is fittedly inserted into the extending slot 3211' so as to attach the front guider 20' to the coupling means 30'.

The detachable front guider arrangement 2' further comprises a pair of locking means 40' for locking up the two ends of the front guider 20' to the coupling means 30' respectively, wherein each of the locking means 40' has a through locking slot 41' formed on a sidewall of the end portion of the joint member 32' and a locking flange 42' formed on a corresponding sidewall of an end portion of the front guider 20', wherein the locking flange 42' is engaged with the locking slot 41' when the end of the front guider 20' is inserted into the extending slot 3211' of the joint member 32', so as to securely lock up the front guider 20' to the coupling means 30'.

Figure 6:
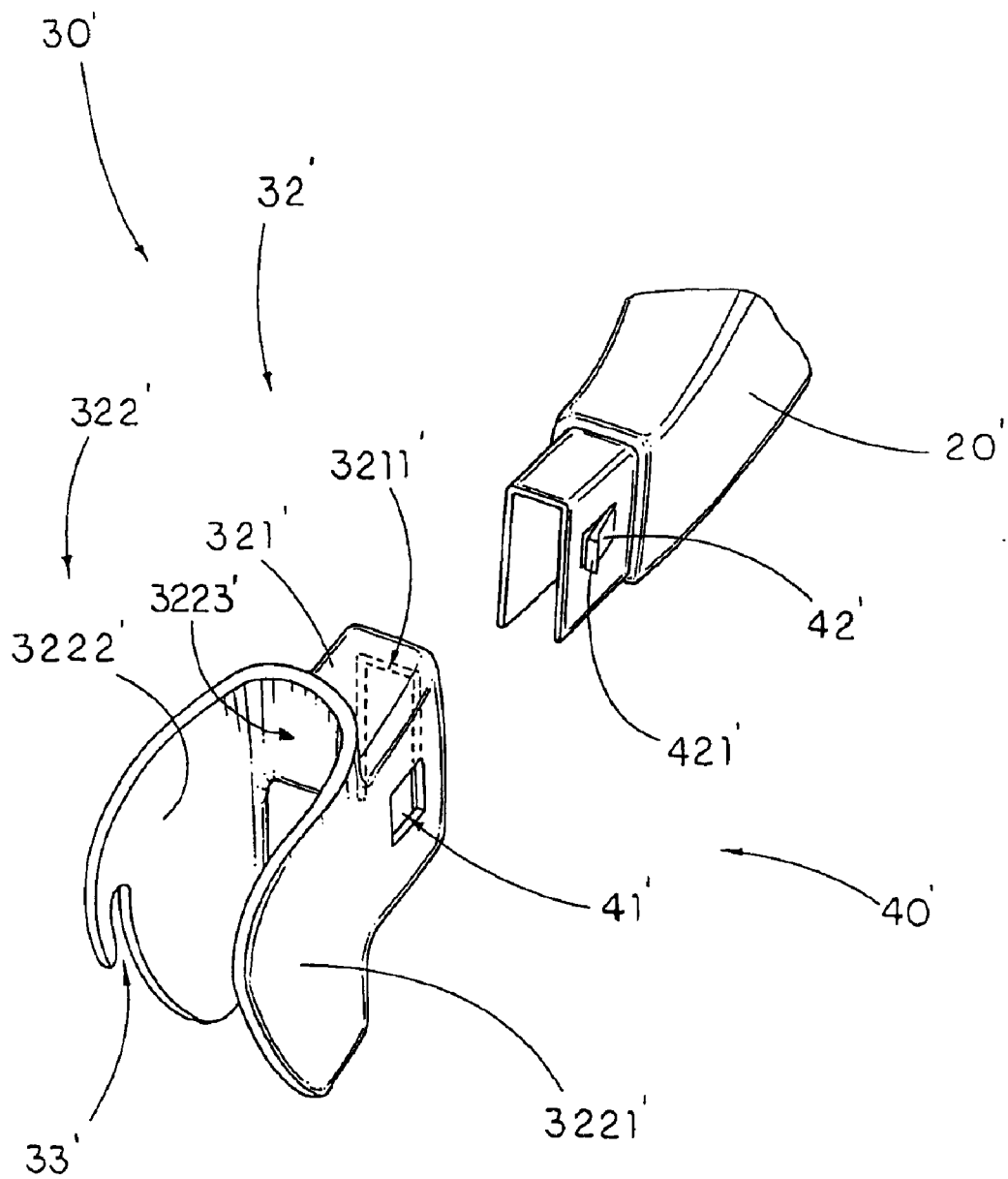
FIG. 6 is a partially perspective view of the detachable front guider arrangement according to the above second preferred embodiment of the present invention.

Accordingly, the locking flange 42' is formed by cutting through the sidewall of the front guider 20', wherein one end of the locking flange 42' is integrally extended from the sidewall of the front guider 20' while an opposed free end of the locking flange 42' is in a suspended manner, so as to provide a flexibility of the locking flange 42'. Thus, a locking tip 421' is integrally protruded from the free end of the locking flange 42' for blocking on the locking flange 42' out of the locking slot 41', so as to lock up the front guider 20' to the coupling means 30', as shown in FIG. 6.

Figure 7:
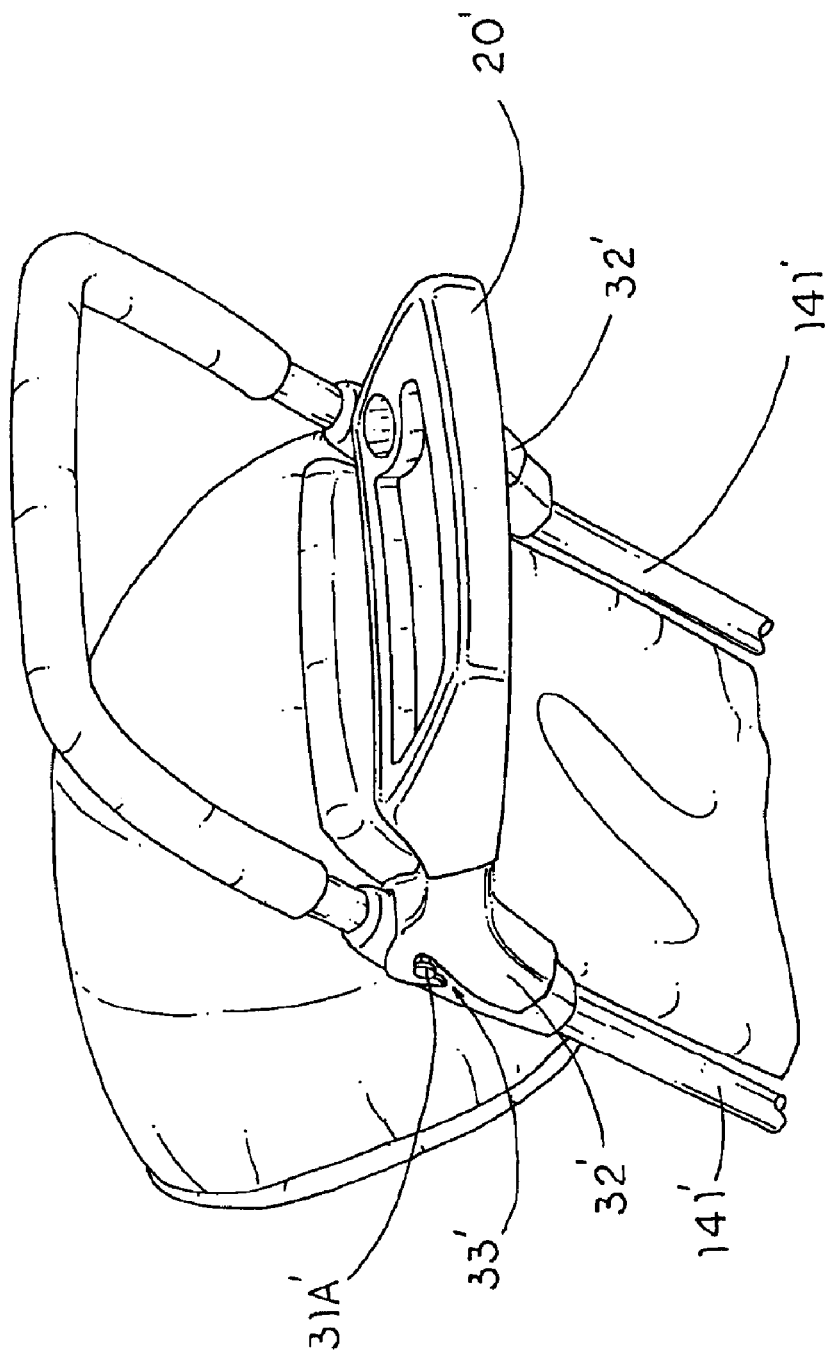
FIG. 7 is a partially rear perspective view of the stroller incorporating with the detachable front guider arrangement according to the above second preferred embodiment of the present invention, illustrating the detachable front guider arrangement detachably mounting at the handle frame of the stroller.

As shown in FIG. 7, the detachable front guider arrangement 2' further comprises two additional locking latches 31A', which are embodied as two rivets respectively, opposedly and outwardly protruded from outer sides of the two handle arms 141' of the handle frame 14' respectively, wherein a predetermined length of a neck portion of each of the locking latches 31A' is protruded from the outer side of the respective handle arm to engage with the locking groove 33' of the respective joint member 32' so as to securely lock up the front guider 20' with the handle frame 14'.

In other words, the detachable front guider arrangement 2' is adapted to be selectively mount to the front frame 11' to form as a front boundary frame for the stroller to restrict the user, such as a baby or a young child, sitting on the seat frame 13' and to the handle frame 14' to form as a tray for the parents, especially when the parents carry a drink or food which can be placed on the tray instead of inside the stroller.

Accordingly, the additional locking latches 31A' can be formed on the stroller 1 according to the first embodiment so that the front guider 20 which is embodied as the hand bar can be selectively mounted to the handle frame 14 in a detachably connecting manner to form as an adjustable handle bar for the stroller 1.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A stroller, comprising:

a front frame having two front leg frames, a back frame constructed to support a seat frame thereon, and a handle frame having two handle arms upwardly extended from said front frame; and a detachable front guider arrangement, comprising:

a front guider; and a pair of coupling means for detachably coupling two ends of said front guider with said two front leg frames of said front frame respectively, each of said coupling means comprising:

at least a locking latch, wherein said two locking latches are opposedly and outwardly protruded from outer sides of said two front leg frames of said front frame respectively, wherein a predetermined length of a neck portion of each of said locking latches is protruded from said outer side of said respective front leg frame; and a joint member, wherein said two joint members are mounted on said two ends of said front guider and detachably coupled with said two front leg frames respectively, wherein each of said joint members comprises a head joint connecting with said respective end of said front guider and a base joint which has a U-shaped cross section comprising inner and outer parallel supporting walls in a parallel manner to fittedly mount said respective front leg frame between said inner and outer supporting walls, wherein at least a locking groove is formed on said outer supporting wall of each of said joint members and arrangement to engage with said respective locking latch, wherein each of said locking grooves is an elongated groove formed at an edge of said respective outer supporting wall, wherein an opening of said locking groove is provided at a bottom end of said outer supporting wall in such a manner that said joint members are engaged with said two front leg frames respectively while said two locking latches are engaged into said two locking grooves respectively in a vertical movable manner, so as to lock up said two joint members on said two front respectively, wherein an inner biasing surface is formed on an inner side of said respective base joint to bias against said respective front leg frame, wherein when said base joints are mounted on said front leg frames respectively, said inner biasing surfaces of said base joints are frictionally engage with said front leg frames respectively and guides said locking latches to align with said openings of said locking grooves respectively in such a manner that said locking latches are slidably engaged with said locking grooves respectively when said inner biasing surfaces of said base joints are downwardly slid along said front leg frames respectively.

2. The stroller, as recited in claim 1, wherein said two coupling means further comprises two additional locking latches respectively, wherein said two additional locking latches are opposedly and outwardly protruded from outer sides of said two handle arms of said handle frame respectively in such a manner that said front guider is selectively coupled with said front frame and coupled with said handle frame.

3. The stroller, as recited in claim 2, wherein said two locking latches are two rivets perpendicularly mounted on said two outer sides of said two front leg frames respectively.

4. The stroller, as recited in claim 3, wherein a distance between said inner and outer supporting walls of each of said joint members is made to enable said joint member to fittingly mount on said respective front leg frame in such a manner that two inner surfaces of said inner and outer supporting walls are biased against said respective front leg frame in a sandwiched manner while said inner biasing surface of each of said joint members substantially is biased against said respective front leg frame to guide said opening of said locking groove above said respective locking latch, so that when said locking latches are engaged with said two locking grooves respectively said front guider is securely mounted on said front frame so as to prevent an unwanted movement of said front guider with respect to said front frame.

5. The stroller, as recited in claim 4, wherein said front guider is a food tray having two ends detachably connected to said two coupling means respectively, wherein said head joint of said joint member comprises a U-shaped extending slot and said end of said front guider has a U-shaped cross section and is fittedly inserted into said extending slot so as to detachably attach said front guider to said coupling means.

6. The stroller, as recited in claim 5, wherein said detachable front guider arrangement further comprises a pair of locking means for locking up said two ends of said front guider to said coupling means respectively, wherein each of said locking means has a through locking slot formed on a sidewall of said joint member and a locking flange formed on a corresponding sidewall of said front guider in such a manner that said locking flange is engaged with said locking slot when said end of said front guider is inserted into a hollow holder of said joint member, so as to securely lock up said front guider to said coupling means.

7. The stroller, as recited in claim 6, wherein said locking flange is formed by cutting through said sidewall of said front guider, wherein one end of said locking flange is integrally extended from said sidewall of said front guider while an opposed free end of said locking flange is in a suspended manner, so as to provide a flexibility of said locking flange.

8. The stroller, as recited in claim 7, wherein each of said locking flanges has a locking tip integrally protruded from said free end of said locking flange for blocking said locking flange out of said locking slot, so as to lock up said front guider to said coupling means.

9. The stroller, as recited in claim 3, wherein said front guider is a food tray having two ends detachably connected to said two coupling means respectively, wherein said head joint of said joint member comprises a U-shaped extending slot and said end of said front guider has a U-shaped cross section and is fittedly inserted into said extending slot so as to detachably attach said front guider to said coupling means.

10. The stroller, as recited in claim 9, wherein said detachable front guider arrangement further comprises a pair of locking means for locking up said two ends of said front guider to said coupling means respectively, wherein each of said locking means has a through locking slot formed on a sidewall of said joint member and a locking flange formed on a corresponding sidewall of said front guider in such a manner that said locking flange is engaged with said locking slot when said end of said front guider is inserted into a hollow holder of said joint member, so as to securely lock up said front guider to said coupling means.

11. The stroller, as recited in claim 10, wherein said locking flange is formed by cutting through said sidewall of said front guider, wherein one end of said locking flange is integrally extended from said sidewall of said front guider while an opposed free end of said locking flange is in a suspended manner, so as to provide a flexibility of said locking flange.

12. The stroller, as recited in claim 11, wherein each of said locking flanges has a locking tip integrally protruded from said free end of said locking flange for blocking said locking flange out of said locking slot, so as to lock up said front guider to said coupling means.

13. The stroller, as recited in claim 2, wherein said front guider is a food tray having two ends detachably connected to said two coupling means respectively, wherein said head joint of said joint member comprises a U-shaped extending slot and said end of said front guider has a U-shaped cross section and is fittedly inserted into said extending slot so as to detachably attach said front guider to said coupling means.

14. The stroller, as recited in claim 13, wherein said detachable front guider arrangement further comprises a pair of locking means for locking up said two ends of said front guider to said coupling means respectively, wherein each of said locking means has a through locking slot formed on a sidewall of said joint member and a locking flange formed on a corresponding sidewall of said front guider in such a manner that said locking flange is engaged with said locking slot when said end of said front guider is inserted into a hollow holder of said joint member, so as to securely lock up said front guider to said coupling means.

15. The stroller, as recited in claim 14, wherein said locking flange is formed by cutting through said sidewall of said front guider, wherein one end of said locking flange is integrally extended from said sidewall of said front guider while an opposed free end of said locking flange is in a suspended manner, so as to provide a flexibility of said locking flange.

16. The stroller, as recited in claim 15, wherein each of said locking flanges has a locking tip integrally protruded from said free end of said locking flange for blocking said locking flange out of said locking slot, so as to lock up said front guider to said coupling means.

17. The stroller, as recited in claim 1, wherein said two locking latches are two rivets perpendicularly mounted on said two outer sides of said two front leg frames respectively.

18. The stroller, as recited in claim 1, wherein a distance between said inner and outer supporting walls of each of said joint members is made to enable said joint member to fittingly mount on said respective front leg frame in such a manner that two inner surfaces of said inner and outer supporting walls are biased against said respective front leg frame in a sandwiched manner while said inner biasing surface of each of said joint members substantially is biased against said respective front leg frame to guide said opening of said locking groove above said respective locking latch, so that when said locking latches are engaged with said two locking grooves respectively said front guider is securely mounted on said front frame so as to prevent an unwanted movement of said front guider with respect to said front frame.

19. The stroller, as recited in claim 1, wherein said front guider is a food tray having two ends detachably connected to said two coupling means respectively, wherein said head joint of said joint member comprises a U-shaped extending slot and said end of said front guider has a U-shaped cross section and is fittedly inserted into said extending slot so as to detachably attach said front guider to said coupling means.

20. The stroller, as recited in claim 19, wherein said detachable front guider arrangement further comprises a pair of locking means for locking up said two ends of said front guider to said coupling means respectively, wherein each of said locking means has a through locking slot formed on a sidewall of said joint member and a locking flange formed on a corresponding sidewall of said front guider in such a manner that said locking flange is engaged with said locking slot when said end of said front guider is inserted into a hollow holder of said joint member, so as to securely lock up said front guider to said coupling means.

21. The stroller, as recited in claim 20, wherein said locking flange is formed by cutting through said sidewall of said front guider, wherein one end of said locking flange is integrally extended from said sidewall of said front guider while an opposed free end of said locking flange is in a suspended manner, so as to provide a flexibility of said locking flange.

22. The stroller, as recited in claim 21, wherein each of said locking flanges has a locking tip integrally protruded from said free end of said locking flange for blocking said locking flange out of said locking slot, so as to lock up said front guider to said coupling means.

* * * * *